United States Patent [19]

Utter

[11] Patent Number: 4,606,706
[45] Date of Patent: Aug. 19, 1986

[54] INTERNAL COMPLIANT SEAL FOR COMPRESSOR

[75] Inventor: Robert E. Utter, Genoa, Wis.

[73] Assignee: American Standard Inc., New York, N.Y.

[21] Appl. No.: 789,891

[22] Filed: Oct. 21, 1985

[51] Int. Cl.$^4$ ............... F04B 21/00; F04B 39/12; F16L 27/00
[52] U.S. Cl. ............... 417/313; 417/902; 285/158; 285/334.1; 285/334.3
[58] Field of Search ............... 285/158, 334.1, 334.3; 417/313, 902

[56] References Cited

U.S. PATENT DOCUMENTS

| | | | |
|---|---|---|---|
| 739,082 | 9/1903 | Hills | 285/158 |
| 934,983 | 9/1909 | Schuermann | 285/334.3 |
| 1,755,104 | 4/1930 | Dierlein | 285/158 |
| 2,153,773 | 4/1939 | Patrignani | 417/902 |
| 3,840,257 | 10/1974 | Moore | 285/334.3 |
| 4,086,032 | 4/1978 | Nishioka | 417/902 |
| 4,088,350 | 5/1978 | Lee | 285/334.1 |
| 4,240,774 | 12/1980 | Ladusaw | 418/248 |
| 4,252,346 | 2/1981 | Sundholm | 285/334.1 |
| 4,496,293 | 11/1985 | Nakamura | 417/902 |
| 4,538,835 | 9/1985 | Sundholm | 285/158 |
| 4,545,742 | 8/1985 | Schaefer | 417/372 |

FOREIGN PATENT DOCUMENTS

| | | | |
|---|---|---|---|
| 780239 | 3/1968 | Canada | 285/158 |
| 56694 | 4/1982 | Japan | 417/902 |

Primary Examiner—William L. Freeh
Attorney, Agent, or Firm—Ronald M. Anderson; Carl M. Lewis; William J. Beres

[57] ABSTRACT

In a hermetic compressor, a seal extending between a suction port and a second port in fluid communication with an internal chamber disposed adjacent an electric motor. The seal includes a cylindrical tubular member, one end of which slidingly fits within the suction port. A slotted conical flange on the other end of the tubular member fits around the port on the chamber. When a suction line is attached to the suction port with a threaded nut and fitting, it abuts against the projecting end of the tubular member, forcing the cone-shaped flange on the other end of the tubular member to flatten slightly as it seats against the external surface of the chamber. Most of the suction fluid entering the suction port flows through the tubular member into the chamber and through the electric motor to cool it. The compliant flange on the seal allows substantial tolerance in the spacing and angular displacement of the port in the internal chamber relative to the suction port in the shell. This minimizes alignment problems during both compressor assembly and operation.

14 Claims, 4 Drawing Figures

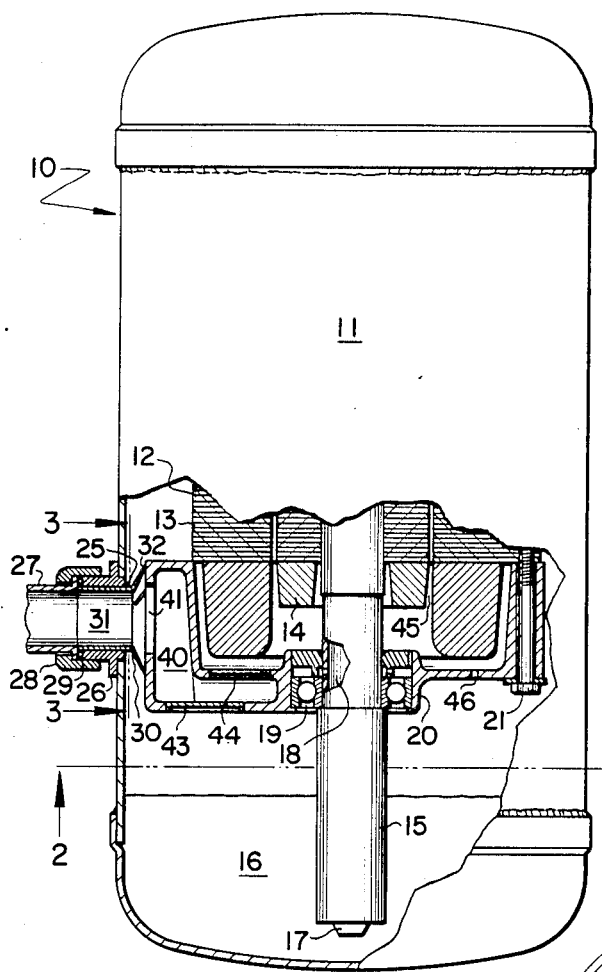
FIG. 1
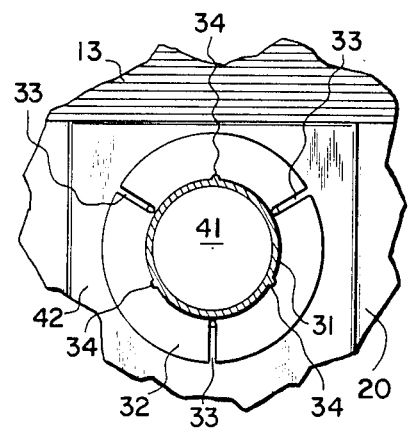
FIG. 3
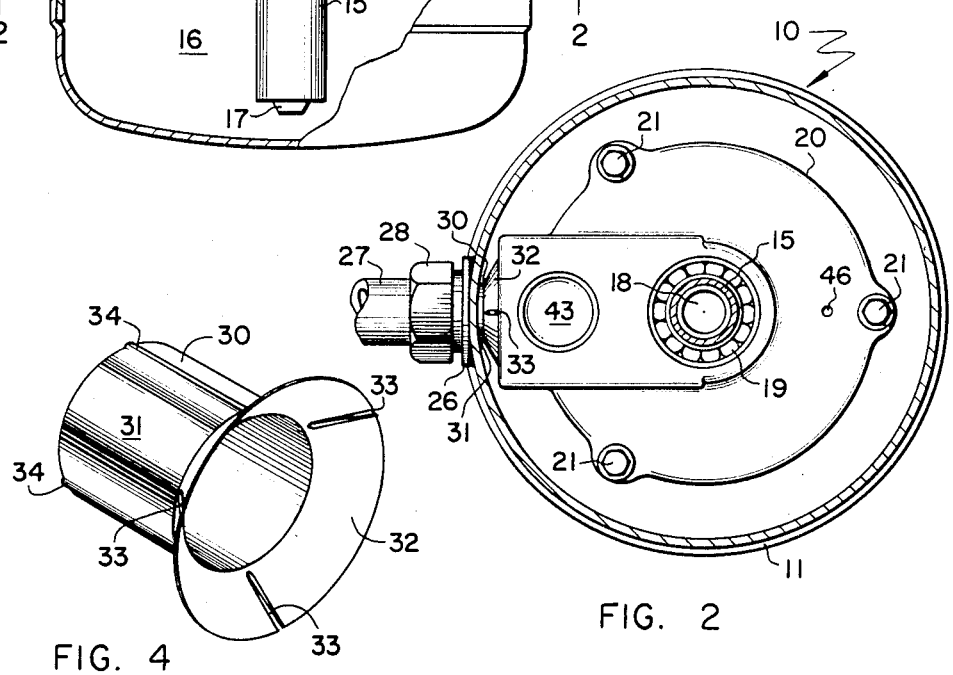
FIG. 2
FIG. 4

INTERNAL COMPLIANT SEAL FOR COMPRESSOR

TECHNICAL FIELD

This invention generally pertains to an internal compressor seal or connecting line and specifically to a seal that extends between a port in a compressor shell and another port in the wall of an internal chamber.

BACKGROUND ART

Assembly of a typical hermetic compressor often requires that components fit inside the hermetic shell with very small tolerances for radial, axial, and angular position. This is particularly troublesome when attaching an internal suction line between a port in the shell and a port on an internal chamber attached to the compressor or motor body. Manufacturing tolerance and human error can cause substantial variation in the initial position of the compressor/motor assembly relative to the port in the shell. These variables, coupled with the expected movement or vibration of the compressor/motor unit on its mounts during operation of the compressor effectively dictate use of a flexible connecting line, sufficiently long to allow for flexure during assembly and slight movement during operation.

Even in designs in which the compressor and motor are rigidly mounted within the hermetic shell rather than spring mounted, there is often a problem during assembly with maintaining close tolerance in the position of internal components relative to the enclosing shell. For this reason, it is sometimes difficult or time consuming to fit an internal connecting line between a port in the shell and a port on a chamber attached to the compressor/motor. Conventional techniques use flexible metal tubes of annealed copper which are often longer than necessary to merely bridge the intervening space between the ports, since the extra length permits the tubing to bend without crimping or breaking. Such tubes may be relatively expensive in material cost, and their use may require a larger hermetic shell be used to accommodate their added volume.

In consideration of the foregoing, it is an object of this invention to provide a compact internal compliant seal that connects a port in a compressor shell with a port in an internal chamber on a compressor/motor assembly.

It is a further object to provide an internal seal that accommodates substantial variation in radial, axial, and angular alignment of the compressor/motor assembly relative to the outer shell.

Another object is to provide an internal seal that is sufficiently compliant to accommodate movement of the compressor/motor assembly during operation of the compressor.

A still further object is to provide a seal that is relatively easy to install during the assembly of the compressor.

Yet a still further object is to provide a relatively low cost internal compliant seal.

These and other objects of the invention will be apparent from the attached drawings and the description of the preferred embodiment that follows hereinbelow.

SUMMARY OF THE INVENTION

The subject invention is a seal used in a compressor having an outer shell and an internal chamber spaced apart from the inner surface of the outer shell. The seal extends between a first port disposed in the outer shell and a second port disposed in the internal chamber. It comprises a tubular member sized to closely fit through the first port in sliding engagement therewith. The other end of the tubular member includes a cone-shaped flange that sealingly contacts the outer surface of the chamber around the second port. The flange has a plurality of spaced apart radial slots which permit it to flatten out under compression when attachment of a suction line to the suction port forces the seal inward. Fluid flow between the first and second ports is thereby substantially confined within the seal.

BRIEF DESCRIPTION OF THE DRAWINGS

FIG. 1 shows a cross-sectional view of the seal, visible in a cutaway view of the hermetic shell of a compressor.

FIG. 2 is a cross-sectional view of the compressor and seal taken along section line 2—2 of FIG. 1.

FIG. 3 is a cross-sectional view of a portion of the compressor taken along section line 3—3 of FIG. 1.

FIG. 4 is a perspective view of the seal comprising the subject invention.

DESCRIPTION OF THE PREFERRED EMBODIMENT

A compressor system generally denoted by reference numeral 10 is shown in FIG. 1. Compressor system 10 is a rotary compressor, housed in a hermetic shell 11. The actual compressor portion of system 10 is not shown in FIG. 1 since details regarding the compressor need not be disclosed to understand the form and function of the subject invention; however, in an actual application of the preferred embodiment of the invention, a scroll compressor is used. A sliding vane compressor or other rotary compressor would be equally suitable.

Compressor system 10 is driven by an internal electric motor 12 which includes a stator 13 and rotor 14. A drive shaft 15 passes through rotor 14, and its lower end extends into a reservoir of oil 16. Centrifugal oil pump 17 is disposed at the lower distal end of drive shaft 15 and is operative to cause oil to flow upward through an internal bore 18 within the drive shaft, as it rotates. This oil is used to lubricate surfaces subject to friction within the compressor and bearings such as the lower drive shaft main bearing 19. Drive shaft main bearing 19 is supported by a cast framework member 20. Framework 20 is connected to stator 13 with three threaded bolts 21, disposed at spaced intervals around its periphery and completely underlies and encloses the lower end of motor 12.

Suction gas enters compressor system 10 through suction port 25 disposed in the side of hermetic shell 11. Included on the suction port is a threaded fitting 26 used to secure a suction line 27 by means of a mating threaded nut 28. The end of suction line 27 is drawn up against a square section teflon seal as the threaded nut 28 is tightened, thereby forming a hermetic seal. As nut 28 is tightened onto fitting 26, the end of suction line 27 also abuts against the end of seal 30, forcing it to slide inwardly within suction port 25.

Turning now to FIG. 4, the structural details of seal 30 are shown apart from its installed application with greater clarity. Seal 30 includes a cylindrical tubular portion 31 having a diameter slightly smaller than the diameter of suction port 25. A conical flange 32 is formed on the end of seal 30 that extends inside of hermetic shell 11. Flange 32 includes three spaced apart radially aligned slots 33 which extend radially inward from its outer circumference almost to the tubular body portion. Slots 33 serve to increase the flexibility of conical flange 32, permitting it to flatten under compression. In the preferred embodiment, seal 30 is injection molded of a relatively stiff but flexible, plastic material. The elastic characteristics of this material and provision of slots 33 contribute to the flexural compliancy of conical flange 32. Three ribs 34 are formed on the outer surface of the tubular portion 31 at spaced apart intervals. These ribs improve the ease with which seal 30 is slidingly fit within suction port 25. Any small variations in the diameter of suction port 25 is compensated for by flexure of the wall of the tubular member 31 between each of the ribs 34, thereby substantially increasing its tolerance to such dimensional variations.

During assembly of compressor system 10, seal 30 is inserted within suction port 25 from inside shell 11 prior to the installation of motor 12, and pushed-in until flange 32 abuts against the inside of hermetic shell 11. Once seal 30 is in place, motor 12 (and attached compressor—not shown) can be positioned and fastened in place within hermetic shell 11 without any interference in fit from the seal. Disposed immediately opposite suction port 25, and defined by framework member 20, is an internal chamber 40. The outer wall of chamber 40 includes a port 41.

Prior to the installation of suction line 27, flange 32 does not contact the outer surface of framework 20, since, as explained above, when seal 30 is initially installed, it is pushed all the way into suction port 25 from the inside of hermetic shell 11. After suction line 27 is connected, seal 30 is forced inward toward the outer surface of chamber 40, and conical flange 32 contacts that surface and flattens slightly around the periphery of port 41 under the force of compression provided by the connected suction line.

Referring to FIG. 3, the outer surface of framework 20 is die cast to form a flat surface 42 around port 41 against which flange 32 abuts. The flat surface 42 improves the quality of the seal formed by conical flange 32 as it flattens under compression. The spacing between the inner surface of hermetic shell 11 around suction port 25 and surface 42 around port 41 is not critical, because conical flange 32 can flex (by flattening) up to one-quarter of an inch after it initially contacts surface 42. In addition to this tolerance for variation in the radial dimension, seal 30 also permits a substantial tolerance in axial dimension and in angular displacement of port 41 relative to suction port 25, i.e., the relative displacement between the centers of port 41 and suction port 25. The diameter of the outer periphery of conical flange 32 is greater than the diameter of port 41. Since flange 32 is cone shaped and the periphery of the flange initially contacts flat surface 42, the center of suction port 25 (and of seal 30) need not be perfectly aligned with the center of port 41 to provide an adequate seal.

Clearly, some of the suction gas flowing through suction port 25 and through seal 30 leaks out through slots 33. However, the fluid surrounding chamber 40 within hermetic shell 11 is substantially at compressor suction pressure and that pressure is less than 1 psi lower than the pressure of suction fluid entering suction port 25. Since there is a very small differential pressure between the fluid in chamber 40 and the fluid surrounding chamber 40 enclosed within hermetic shell 11, a very small percentage of the suction gas flowing through seal 30 leaks out through the imperfect seal caused by slots 33. The relatively small leakage that does occur, is of little significance since any fluid that leaks into the volume enclosed by shell 11 still enters the compression cycle. It is only necessary that a substantial portion of the suction fluid passing through seal 30 enter chamber 40.

As shown in FIGS. 1 and 2, chamber 40 is generally "L" shaped in cross section, and rectangular in plan view. An access plug 43 is installed in a hole formed in framework 20 during assembly of compressor 10, as is a filter screen 44. Suction gas entering suction port 25 flows through internal seal 30 and into chamber 40 so that it can be channeled through motor 12 for cooling purposes prior to entering the compression cycle. The suction gas flowing out of chamber 40 passes through filter screen 44 and up through the rotor/stator annulus 45 to cool the windings on stator 13. Any oil carried with the suction gas into the area of the motor 12 flows back into reservoir 16 through an oil drain orifice 46 disposed within the bottom of framework member 20, on the side opposite chamber 40.

Internal seal 30 provides an inexpensive means for directing suction gas from a suction port 25 to an internal chamber 40 without the use of a bulky and expensive internal connecting line. In addition, seal 30 improves the ease with which compressor 10 is assembled during manufacture, allows substantial tolerance in the dimensions between the ports which it seals and between which it conveys suction fluid, and is sufficiently compliant to maintain an adequate seal even during vibration of the motor 12 relative to hermetic shell 11 during operation of compressor system 10. It will be appreciated, that although internal seal 30 is a relatively simple component, it provides substantial advantages over the known prior art.

Modifications to the preferred embodiment of the subject invention will be apparent to those skilled in the art within the scope of the claims that follow hereinbelow.

I claim:

1. In a compressor having an outer shell and an internal chamber spaced apart from the inner surface of the outer shell, a seal extending between a first port disposed in the outer shell and a second port disposed in the chamber, said seal comprising: a tubular member sized to closely fit through the first port in sealing engagement therewith and including a radially extending flange on one end which is compliant under a compressive force directed along the longitudinal axis of the tubular member, said flange overlying and abutting the outer surface of the chamber around the second port, whereby the seal is operative to substantially confine fluid flow in the space between the first and second ports.

2. The seal of claim 1 wherein the tubular member is a cylinder and wherein the flange extends outward from the tubular member forming a cone which can be flattened by compression to seal against the outer surface of the chamber, around the second port.

3. The seal of claim 1 wherein the flange includes a plurality of radial slots spaced apart at intervals around its circumference and operative to improve the flexibility of the flange permitting it to better conform to the outer surface of the internal chamber and to flatten against that surface under a compressive force.

4. The seal of claim 1 wherein the first port includes a fitting adapted to connect to a suction line through which fluid to be compressed flows into the compressor, said suction line abutting against the end of the tubular member, forcing the tubular member toward the chamber.

5. The seal of claim 1 wherein the compressor further includes an electric motor disposed within the outer shell, said motor including a stator and a rotor.

6. The seal of claim 5 wherein the chamber is disposed at one end of the electric motor, adjacent to the stator.

7. The seal of claim 6 wherein said tubular member is operative to convey fluid from the first port into the chamber via the second port, and wherein said fluid is used to cool the electric motor as the fluid flows out of the chamber and through a gap between the rotor and the stator.

8. In a hermetic shell compressor used for compressing a fluid and including a suction port, an electric motor disposed inside the hermetic shell, an internal chamber spaced apart from the inner surface of the hermetic shell, and a port disposed in a wall defining the internal chamber opposite the suction port, a seal extending between the suction port and the port in the internal chamber, said seal comprising: a cylindrical tubular member one end of which slidingly engages the suction port and including on its other end a radially extending cone-shaped flange which is compliant under a compressive force directed along the longitudinal axis of the tubular member, said flange overlying and abutting the outer surface of the chamber wall and sized to fit around the port in the internal chamber, sealing around said internal chamber port as the cone-shaped flange resiliently flattens under the compressive force, whereby said seal is operative to convey substantially all the fluid entering the suction port into the chamber through the space between the hermetic shell and the internal chamber.

9. The seal of claim 8 wherein the tubular member and the cone-shaped flange are molded as a single piece from compliant plastic material.

10. The seal of claim 8 wherein the tubular member includes a plurality of integral ribs on its outer surface running parallel to its longitudinal axis.

11. The seal of claim 8 wherein the suction port is adapted to connect to a suction line using a nut and mating threaded fitting, and wherein as the nut is tightened on the threaded fitting, the suction line seats against said one end of the tubular member causing it to slide within the suction port and to compress the compliant cone-shaped flange at the other end of the tubular member, flattening the flange against the outer surface of the chamber wall.

12. The seal of claim 8 wherein the flange includes a plurality of spaced apart radial slots which are operative to permit the cone-shaped flange to flatten under compression.

13. The seal of claim 8 wherein the electric motor includes a rotor and a stator, and wherein the internal chamber is disposed adjacent one end of the electric motor.

14. The seal of claim 13 wherein the tubular member is operative to convey suction fluid into the internal chamber so that said fluid can flow between the rotor and stator to cool the motor before the fluid is compressed.

* * * * *